3,713,973
NUCLEAR FUEL ASSEMBLY
Georges Normand, Ginasservis, and Henri Venobre, Vinon sur Verdon, France, assignors to Commissariat a l'Energie Atomique, Paris, France
Filed Jan. 9, 1969, Ser. No. 790,080
Claims priority, application France, Jan. 31, 1968, 138,161
Int. Cl. G21c 3/32
U.S. Cl. 176—78          8 Claims

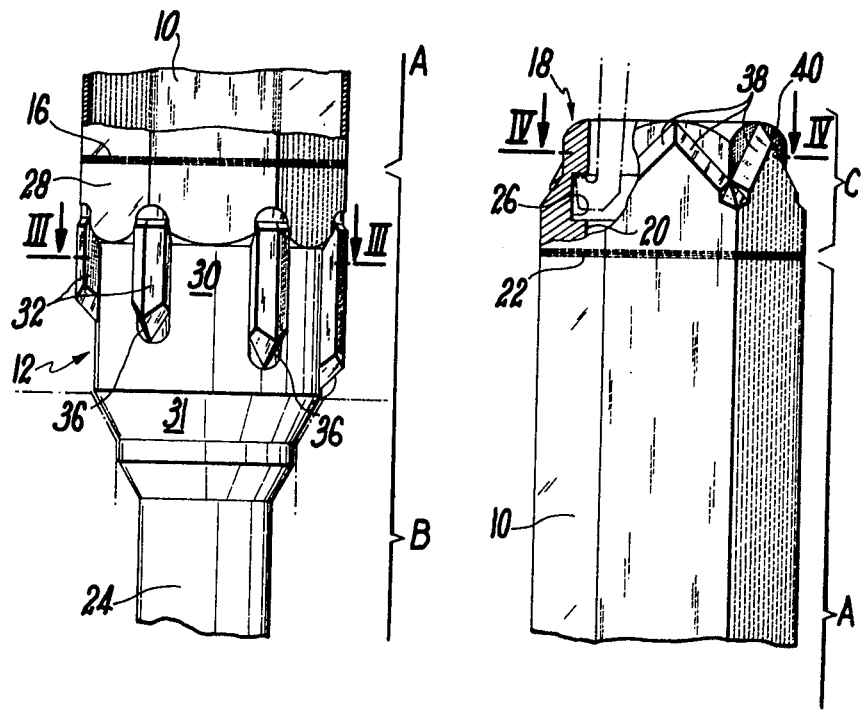
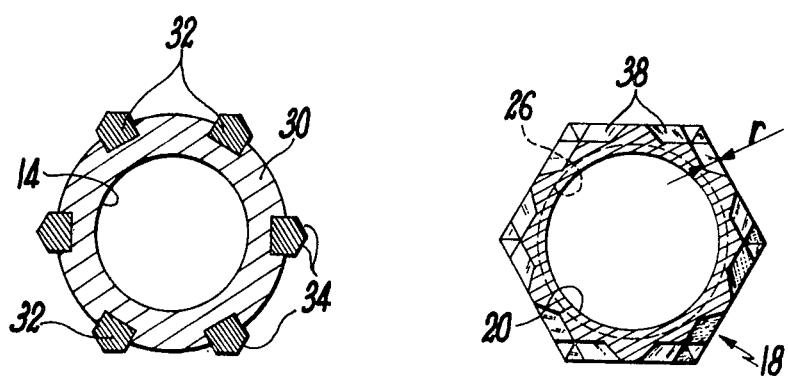
FIG. 1   FIG. 2   FIG. 3   FIG. 4
INVENTORS
GEORGES NORMAND and
HENRI VENOBRE
BY Craig & Antonelli
ATTORNEYS United States Patent Office 3,713,973
Patented Jan. 30, 1973

ABSTRACT OF THE DISCLOSURE

A nuclear fuel assembly comprises a central portion having a polygonal cross-section and two end portions. One of the end portions has a smaller cross-section than the central portion and is provided with longitudinal lugs each forming a cam and terminating in a bevelled tip, said lugs being disposed in the line of extension of the ridges of said polygonal cross-section. Each face of the other end portion is provided with a V-shaped ramp for supporting said bevelled tips and guiding said lugs towards the summits of said polygonal cross-section.

---

This invention relates to nuclear fuel assemblies which have a polygonal transverse cross-section along the greater part of their length and are intended to be placed in contiguous relation so as to constitute the core of a nuclear reactor, the insertion and withdrawal of the fuel assemblies being carried out by displacing these latter vertically along their axes.

The insertion of a nuclear fuel assembly in a reactor core and in a position-location which has been left vacant between other fuel assemblies creates a number of problemes which arise from the need to control this operation from a distance. The insertion operation can only be carried out if the fuel assembly is first placed opposite to the receiving location and then suitably oriented during its downward motion towards said location. Whereas it is relatively easy to satisfy the first condition with a sufficiently high degree of accuracy, the second condition referred to involves considerably greater difficulty. It has been proposed in the past to carry out the correct orientation of the assembly either by making use of a handling machine which is do designed as to retain the orientation given to the fuel assembly at the beginning of the handling cycle, or by incorporating with this machine a mechanism for subjecting the assembly to a movement of rotation through the desired angle if this should prove necessary. The first solution leads to a complex design in which the machine must be free from working play or backlash. The second solution referred to has not produced wholly satisfactory results up to the present time.

This invention is intended to provide a nuclear reactor fuel assembly with means for producing the automatic orientation of each assembly at the time of its insertion in a reactor core location as defined either by identical fuel assemblies or similar components (such as moderator bricks) which have the same cross-section.

With this objective, the invention proposes a nuclear fuel assembly having a central portion of polygonal cross-section which is endowed with symmetry of revolution and can take up the major part of the length of the assembly, one of the end portions of said fuel assembly which is of smaller cross-sectional area than the central portion being provided with longitudinal lugs which form cams with bevelled edges and which are disposed in the line of extension of the ridges of the normal cross-section, the other end portion of said fuel assembly being provided at the extremity of each face of the assembly with a V-shaped ramp which is intended to provide a bearing surface for said bevelled edges and to guide said lugs towards the vertices of the polygonal cross-section.

In a preferred but non-limitative application of the invention, the lugs terminate at different levels in order to prevent balancing of the moments arising from the simultaneous abutting contact of a number of lugs with the corresponding ramps.

The invention additionally consists in other arrangements which can advantageously be employed in conjunction with those mentioned in the foregoing but can also be utilized separately. These arrangements will be more readily understood from the following description of one form of construction which is given solely by way of non-limitative example, reference being made to the accompanying drawings, in which:

FIGS. 1 and 2 show respectively the bottom and top portions of the fuel assembly;

FIGS. 3 and 4 are sectional views taken respectively along line III—III of FIG. 1 and along line IV–IV of FIG. 2.

The fuel assembly which is shown in the drawings comprises a central portion A which takes up the greater part of the length of the assembly. Said central portion comprises a casing 10 which has a transverse cross-section in the shape of a regular hexagon and occupied by fuel-pin bundles which are loaded with fissile or fertile material (and which have not been illustrated in the drawings).

The bottom portion B of the fuel assembly comprises a solid end-connector 12 which is pierced by a duct 14 for the flow of coolant and attached to the casing by any permanent fastening means such as a welded joint 16. The top portion C also comprises a solid end-connector 18 which is pierced by a coolant duct 20 (shown in FIG. 4) and which is secured to the casing by means of a welded joint 22.

The bottom end-connector 12 of the fuel assembly is provided at the lower end with a cylindrical extension 24 having a diameter which is distinctly smaller than the transverse dimensions of the central portion A. Said connector extension 24 is intended to engage in a support grid which is shown diagrammatically in chain-dotted lines in FIG. 1 in the position occupied by said grid with respect to the fuel assembly when this latter is in position. The coolant duct 20 comprises an annular chamber 26 which is intended to accommodate the claws of a grappling device (shown in chain-dotted lines) and to permit the assembly to rotate and to assume a slightly inclined position with respect to the vertical if necessary.

The bottom end-connector 12 (as shown in FIGS. 1 and 3) comprises from the top downwards a portion 28 of hexagonal cross-section, the upper extremity of which is intended to fit within the casing 10, a portion 30 which has a smaller diameter and a substantially frusto-conical zone 32 providing a junction with the cylindrical centering extension 24. In accordance with the invention, the bottom end-connector 12 is also provided around the cylindrical portion 30 with longitudinal lugs 32 forming orientation cams and having the same cross-sectional configuration. In the embodiment which is illustrated, provision is made for one lug per ridge, namely for a total of six lugs.

Each lug 32 has a longitudinal ridge which forms an extension of the corresponding ridge of the casing 10 and lateral facets 34 located in the same plane as the faces of the casing 10. The lower end of each cam is provided with two bevelled facets, the ridge 36 on the line of junction of said facets being preferably rounded to form a profile having a small radius of curvature and inclined to the axis of the fuel assembly in a direction such that a thrust exerted on said ridge tends to center the fuel assembly.

The top end-connector 18 of the fuel assembly (as shown in FIGS. 2 and 4) is provided at the extremity of each face of the casing with a ramp having the shape of an inverted V. Said ramp is formed by two facets 38 which take up a radial thickness r (as shown in FIG. 4) of the same order as the distance of radial projection of the lugs 32 and which slope downwards towards the exterior of the fuel assembly, said facets being joined by a ridge 40 which is also downwardly and outwardly inclined. The angle of slope of each facet 38 with respect to a vertical plane is sufficient to ensure that, when the downward motion of the fuel assembly takes place and the lug 32 comes into contact with the facet of an adjacent fuel assembly which is already in position, and taking friction forces into account, the force exerted on said lug 32 is inclined with respect to the vertical and causes the rotation of the downwardly-moving fuel assembly by virtue of the horizontal component of said force.

In order to prevent two lugs 32 from coming into contact with two ramps at the same time, as this would have the effect of jamming the inserted fuel assembly as a result of balancing of the moments of the forces which are exerted on the same fuel assembly, the bottom terminal ridges 36 of the lugs are located at different levels. These levels are advantageously in uniformly stepped relation as shown in FIG. 1.

The operation of the means hereinabove described has become clear from the foregoing and will therefore be described only in brief outline: when a fuel assembly which is suspended by means of the annular chamber 26 is moved down vertically towards its free space between identical fuel assemblies while being approximately centered and located in any orientation, the connector extension 24 carries out an initial engagement of the fuel assembly. This does not affect the initial orientation and can cause the fuel assembly to assume a small angle of inclination with respect to the vertical. Thereupon, the bottom ridge 36 of one of the lugs 32 (usually the lug which has the greatest length) comes into contact with a facet 38 formed in an adjacent fuel assembly which is already in position. Progressively as the downward motion of the fuel assembly takes place, the bottom ridge 36 of the lug 32 slides over the facet 38 with which said lug is in contact, thereby causing the rotation of the fuel assembly which has been introduced. As the downward motion of the assembly proceeds, the action thus produced by the first ridge which comes into contact with the ramp is assisted by the action of the other lugs as each lug in turn is brought into contact. Finally, the lugs 32 are guided successively towards the summits of the prismatic volume defined by the fuel assemblies which are already in position. Once all the lugs have engaged, the fuel assembly continues to move downwards and is restored to the vertical position even if the component from which it is suspended is slightly displaced off-center with respect to the fuel assembly space, provided of course that the suspension affords a sufficient degree of freedom.

It is important to note that the fuel assembly in accordance with the invention provides an automatic orientation system which has an appreciable advantage over comparable systems proposed heretofore in that the flow of coolant is not disturbed in the least degree. In fact, as is apparent from the drawings, the duct 20 remains entirely free and unobstructed.

The invention is obviously not limited to the form of construction hereinabove described and it must be clearly understood that the scope of this patent extends on the one hand to alternative forms of either all or part of the arrangements described which remain within the definition of equivalent means and, on the other hand, to the novel industrial products constituted by reactor cores which consist of a juxtaposed arrangement of fuel assemblies as contemplated in the foregoing.

What we claim is:

1. A nuclear fuel assembly adapted to be vertically positioned between adjacent fuel assemblies of identical shape in order to constitute the core of a nuclear reactor and adapted to be inserted into said core and withdrawn therefrom by vertical displacement thereof, said fuel assembly comprising an elongated central portion whose transverse cross-section is polygonal in shape providing longitudinal edges and two end portions each having a length which is a small fraction of the total length of said fuel assembly, wherein one of the end portions of said fuel assembly has a smaller cross-section than the central portion and is provided with a plurality of longitudinal lugs each terminating in a bevelled tip extending away from said central portion, said lugs being disposed in substantial alignment with the line of extension of the longitudinal edges of said polygonal cross-section, and wherein the other end portion of said fuel assembly is provided on each lateral face with a V-shaped ramp extending away from said central portion for abutment with said bevelled tips of an adjacent fuel assembly for guiding said lugs towards the summits of said polygonal cross-section.

2. A fuel assembly in accordance with claim 1, wherein the lugs terminate at different longitudinal levels in order to prevent balancing of moments which would result from a number of lugs simultaneously coming into abutment with respective ramps of the assemblies.

3. A fuel assembly in accordance with claim 1, wherein the ridges of said bevelled lug tips make an acute angle with the axis of said fuel-assembly.

4. A fuel assembly in accordance with claim 1, wherein said ramp is formed with facets which are inclined toward the exterior of the fuel assembly in the direction of said central portion.

5. A fuel assembly in accordance with claim 1 wherein the upper end portion is provided with a vertical duct having a cross-sectional area which is a substantial fraction of the cross-sectional area of said end portion, an annular chamber being formed in said duct for receiving the claws of a grappling device which is intended to displace the said fuel assembly in a vertical direction.

6. A fuel assembly in accordance with claim 2, wherein said ramp is formed with facets which are inclined toward the exterior of the fuel assembly in the direction of said central portion.

7. A fuel assembly in accordance with claim 2, wherein the ridges of said bevelled lug tips make an acute angle with the axis of said fuel assembly.

8. A fuel assembly in accordance with claim 7, wherein said ramp is formed with facets which are inclined toward the exterior of the fuel assembly in the direction of said central portion.

References Cited

UNITED STATES PATENTS

| | | | |
|---|---|---|---|
| 3,027,314 | 3/1962 | Vaughan | 176—77 X |
| 3,087,882 | 4/1963 | Martin | 176—77 |
| 3,105,035 | 9/1963 | Weems | 176—77 |
| 3,105,804 | 10/1963 | Cottrell et al. | 176—77 X |
| 3,114,688 | 12/1963 | Wyatt et al. | 176—81 X |
| 3,145,152 | 8/1964 | Morrison | 176—77 |
| 3,152,963 | 10/1964 | Bowben et al. | 176—77 |
| 3,158,548 | 11/1964 | Hopkins | 176—77 |
| 3,167,483 | 1/1965 | Liermann | 176—77 |
| 3,170,848 | 2/1965 | Saunders | 176—77 |
| 3,280,003 | 10/1966 | Alfillie et al. | 176—43 |
| 3,049,485 | 8/1962 | Tatlock et al. | 176—81 X |

CARL D. QUARFORTH, Primary Examiner

G. G. SOLYST, Assistant Examiner

U.S. Cl. X.R.

176—30, 77, 81